(12) United States Patent
Tung et al.

(10) Patent No.: US 12,262,057 B2
(45) Date of Patent: Mar. 25, 2025

(54) METHOD AND APPARATUS OF IMAGE COMPRESSION WITH BIT RATE CONTROL

(71) Applicant: Realtek Semiconductor Corp., HsinChu (TW)

(72) Inventors: Hsu-Jung Tung, HsinChu (TW); Chi-Wang Chai, San Jose, CA (US); Weimin Zeng, San Jose, CA (US); Yi-Chen Tseng, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 441 days.

(21) Appl. No.: 17/701,647

(22) Filed: Mar. 22, 2022

(65) Prior Publication Data

US 2023/0308687 A1    Sep. 28, 2023

(51) Int. Cl.
*H04N 19/625* (2014.01)
*H04N 19/176* (2014.01)

(52) U.S. Cl.
CPC ......... *H04N 19/625* (2014.11); *H04N 19/176* (2014.11)

(58) Field of Classification Search
CPC .. H04N 19/625; H04N 19/176; H04N 19/152; H04N 19/192; H04N 19/124
See application file for complete search history.

(56) References Cited

U.S. PATENT DOCUMENTS

| | | | |
|---|---|---|---|
| 6,104,757 A * | 8/2000 | Rhee | H04B 1/66 714/48 |
| 7,457,359 B2 | 11/2008 | Mabey | |
| 9,979,969 B2 * | 5/2018 | Wee | H04N 19/126 |
| 10,341,684 B2 | 7/2019 | Drako | |
| 2004/0179110 A1 * | 9/2004 | Hashimoto | G08B 13/19667 348/222.1 |
| 2006/0050978 A1 * | 3/2006 | Lin | H04N 19/503 375/E7.263 |
| 2006/0078211 A1 * | 4/2006 | Tjandrasuwita | H04N 19/176 375/E7.176 |
| 2010/0232721 A1 * | 9/2010 | Yang | H04N 19/172 375/240.03 |
| 2012/0039194 A1 * | 2/2012 | Kure | H04N 21/6437 375/259 |

* cited by examiner

*Primary Examiner* — Matthew C Bella
*Assistant Examiner* — Andrew B. Jones
(74) *Attorney, Agent, or Firm* — Winston Hsu

(57) ABSTRACT

A method for compressing images based on joint photographic experts group (JPEG) standard includes: compressing data of one or more first image blocks with a first compression level to produce compression data of the one or more first image blocks; adjusting the first compression level to obtain a second compression level according to at least one of a data size-related index regarding the compression data of the one or more first image blocks or a transmission-related index regarding transmission of the compression data of the one or more first image blocks; and compressing data of a second image block with the second compression level.

14 Claims, 5 Drawing Sheets

212

211

210

| 15 | 2 | 8 | 0 | 1 | 0 | 0 | 0 |
|----|---|---|---|---|---|---|---|
| 4  | 0 | 4 | 2 | 0 | 1 | 0 | 0 |
| 6  | 0 | 7 | 0 | 3 | 0 | 0 | 0 |
| 5  | 2 | 7 | 1 | 0 | 0 | 0 | 0 |
| 3  | 0 | 1 | 0 | 3 | 0 | 1 | 0 |
| 1  | 0 | 1 | 0 | 0 | 1 | 0 | 0 |
| 0  | 0 | 0 | 2 | 0 | 0 | 1 | 0 |
| 0  | 1 | 0 | 0 | 0 | 0 | 0 | 0 | ature, structure or characteristic described in connection with the embodiment or example is included in at least one embodiment of the present embodiments. Thus, appearances of the phrases "in one embodiment" or "in an embodiment" in various places throughout this specification are not necessarily all referring to the same embodiment. Furthermore, the particular features, structures or characteristics may be combined in any suitable combinations and/or sub-combinations in one or more embodiments.

METHOD AND APPARATUS OF IMAGE COMPRESSION WITH BIT RATE CONTROL

BACKGROUND OF THE INVENTION

1. Field of the Invention

The present invention relates generally to image compression, and more particularly, to a method and a related apparatus of compressing images based on JPEG standard with bit rate control.

2. Description of the Prior Art

Joint Photographic Experts Group (JPEG) standard is a commonly used for compressing and storing digital images. With JPEG encoding, image data can be compressed to reduce the amount of data without significantly affecting the clarity of the image. However, many electronic systems are constrained in a size of storage space, such as, buffer, that can be allocated to storing compressed images. In order to prevent an overflow of the buffer, implementations of the JPEG compression are often required to compress images in predetermined sizes no matter what the perceptual complexity of the image contents is. Therefore, image quality may become unacceptable bad if the image contents are too complicated. Also, image file sizes may become unacceptably big even if the image contents are simple. On other hand, compression may also need to take transmission of compression images into consideration. Poor communication quality is not conducive to transmission of larger image files, which may lead to defects or flaws in image contents received at a receiver side. Therefore, there is a need to provide an innovative method and apparatus to implement the JPEG compression with bit rate control.

SUMMARY OF THE INVENTION

With this in mind, it is one object of the present invention to provide a bit rate control implementation of image compression based on JPEG standard. According to various embodiments of the present invention, a data size-related index regarding compression data or a transmission-related index regarding transmission of the compression data is monitored. A compression level will be adjusted according to the data size-related index or the transmission-related index, thereby to prevent an overflow of a compression data buffer or a transmission failure.

According to one embodiment, a method for compressing images based on joint photographic experts group (JPEG) standard is provided. The method comprises: compressing data of one or more first image blocks with a first compression level to produce compression data of the one or more first image blocks; adjusting the first compression level to obtain a second compression level according to at least one of a data size-related index regarding the compression data of the one or more first image blocks or a transmission-related index regarding transmission of the compression data of the one or more first image blocks; and compressing data of a second image block with the second compression level.

According to one embodiment of the present invention, an apparatus for compression images based on joint photographic experts group (JPEG) standard is provided. The apparatus comprises: a compression circuit and a compression level control circuit. The compression circuit is configured to compress data of one or more first image blocks with a first compression level to produce compression data of the one or more first image blocks, and compress data of a second image block with a second compression level. The compression level control circuit is coupled to the compression circuit, and configured to adjusting the first compression level to obtain the second compression level according to at least one of a data size-related index regarding the compression data of the one or more first image blocks or a transmission-related index regarding transmission of the compression data of the one or more first image blocks.

These and other objectives of the present invention will no doubt become obvious to those of ordinary skill in the art after reading the following detailed description of the preferred embodiment that is illustrated in the various figures and drawings.

DETAILED DESCRIPTION

In the following description, numerous specific details are set forth in order to provide a thorough understanding of the present embodiments. It will be apparent, however, to one having ordinary skill in the art that the specific detail need not be employed to practice the present embodiments. In other instances, well-known structures, materials or steps have not been presented or described in detail in order to avoid obscuring the present embodiments.

Reference throughout this specification to "one embodiment" or "an embodiment" means that a particular feature, structure or characteristic described in connection with the embodiment or example is included in at least one embodiment of the present embodiments. Thus, appearances of the phrases "in one embodiment" or "in an embodiment" in various places throughout this specification are not necessarily all referring to the same embodiment. Furthermore, the particular features, structures or characteristics may be combined in any suitable combinations and/or sub-combinations in one or more embodiments.

Figure 1:
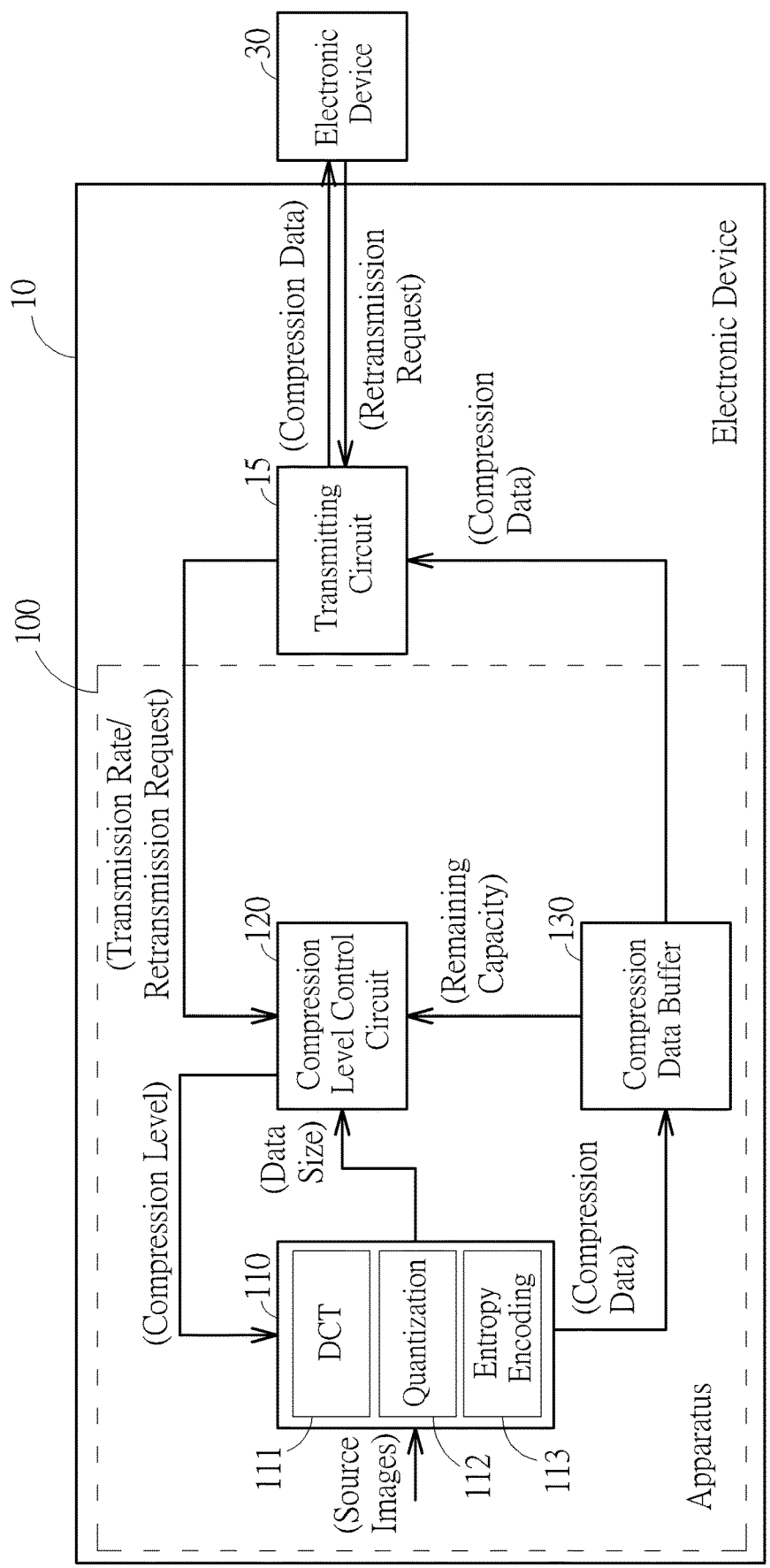
FIG. 1 illustrates a schematic diagram of an electronic device and an apparatus of performing image compression according to one embodiment of the present invention.

FIG. 1 illustrates a block diagram of an electronic device 10 and an apparatus 100 of performing image compression for the electronic device 10 according to one embodiment of the present invention. As illustrated, the electronic device 10 may provide source images to the apparatus 100 and utilize the apparatus 100 to compress source images based on joint photographic Experts group (JPEG) standard. In addition, the electronic device 10 may further utilize a transmitting circuit 15 to transmit compressed images to an electronic device 30 in a wired manner or a wireless manner.

The apparatus 100 comprises a compression circuit 110, a compression level control circuit 120 and a compressed data buffer 130. The compression circuit 110 may comprise a discrete cosine transform (DCT) unit 111, a quantization unit 112 and an entropy encoding unit 113. Based on JPEG standard, pixels of a source image will firstly be decomposed into multiple image blocks (i.e., luminance blocks and chrominance blocks) by the compression circuit 110. Preferably, each block would comprise 8*8 pixels. The DCT unit 111 is configured to perform DCT operation on each block of the source image, thereby to produce multiple DCT blocks (i.e., an 8*8 matrix). Each block includes a plurality of DCT coefficients (preferably 64 DCT coefficients). A DCT block will be provided to the quantization unit 112 and each of the DCT coefficients will be quantized according to a corresponding quantization element in a given quantization table, thereby to obtain a resultant quantized DCT block (the same size as the DCT block) including multiple quantized DCT coefficients. The resultant quantized DCT block will be provided to the entropy encoding unit 113, and the entropy encoding unit 113 encodes the quantized DCT coefficients into a bit stream that is representative of the compressed data of the block. After compressed, produced compression data (e.g., blocks or images) will be stored in the compression data buffer 130 for further purposes. In one embodiment, the compression data in the compression data buffer 130 could be transmitted to the electronic device 30 through the transmitting circuit 15.

In order to have an ideal balance between compressed image quality and compressed data size, the compression level control circuit 120 is configured to control a compression level with which the compression circuit 110 compresses an image. The compression level control circuit 120 is configured to monitor whether a data size-related index regarding compression data is worse or better than expected and accordingly adjust the compression level. In one embodiment, the compression level control circuit 120 may be configured to monitor a remaining capacity or a water level of the compression data buffer 130. Specifically, if it is found that the remaining capacity of the compressed data buffer 130 is lower than a lower threshold or the water level of the compressed data buffer 130 is higher than an upper threshold, the compression level control circuit 120 may determine to level up the current compression level, thereby to save more capacity of the compressed data buffer 130. On the other hand, if it is found that the remaining capacity of the compressed data buffer 130 is higher than an upper threshold or the water level of the compressed data buffer 130 is lower than an lower threshold, the compression level control circuit 120 may determine to level down the current compression level, thereby to improve the image quality. According to various embodiments, the level control circuit 120 may only level up the current compression level in response to the low remaining capacity of the compression data buffer 130 but may not level down the current compression level even if the remaining capacity of the compression data buffer 130 is sufficient.

In another embodiment, the compression level control circuit 120 may be configured to monitor a data size of compression data of compressed image blocks. Specifically, if it is found that the data size of compression data of the compressed blocks is higher than an upper size threshold, the compression level control circuit 120 may determine to level up the current compression level, thereby to potentially reduce a data size of compression data of following image blocks. On the other hand, if it is found that the data size of compression data of the compressed blocks is lower than a lower size threshold, the compression level control circuit 120 may determine to level down the current compression level, thereby to improve the image quality. According to various embodiments, the level control circuit 120 may only level up the current compression level in response to the large data size of the compression data but may not level down the current compression level even if the data size of the compression data is significantly small.

According to various embodiments of the present invention, the compression level control circuit 120 may be configured to monitor a transmission-related index regarding transmission of the compression data, and accordingly adjust the compression level. In one embodiment, when the transmission circuit 15 receives a retransmission request sent from the electronic device 30, which is directed to transmission failure, the compression level control circuit 120 may determine to level up the current compression level. The transmission failure may result from a poor transmission channel quality between the electronic device 10 and the electronic device 30. In response to the transmission failure, the electronic device 30 would send a retransmission request for data retransmission. In order to reduce an amount of data of transmission and accordingly prevent transmission buffer overflow, the compression level control circuit 120 could reduce the data size of the compression data by leveling up the current compression level. Moreover, leveling up the compression level when the transmission failure occurs could also prevent a potential overflow of the compression data buffer 130 (since at the time data accumulated in the buffer faster than consumed from the buffer). Therefore, upon receipt of a retransmission request sent from the electronic device 30, the compression level control circuit 120 may determine to level up the current compression level.

In another embodiment, the compression level control circuit 120 may be configured to monitor a data transmission rate of transmission of compressed image blocks. Specifically, if it is found that the data transmission rate of the transmission of the compression data of the compressed blocks is lower than a lower rate threshold, the compression level control circuit 120 may determine to level up the current compression level. On the other hand, if it is found that the data transmission rate of the transmission of compression data of the compressed blocks is higher than a higher rate threshold, the compression level control circuit 120 may determine to level down the current compression level, thereby to improve the image quality. This is because low data transmission rate may also result from the poor transmission channel quality between the electronic devices 10 and 30, and may further increase the risk of the buffer overflow. In view of this, the compression level control circuit 120 may determine to level down the current compression level in response to the low data transmission rate. According to various embodiments, the level control circuit 120 may only level up the current compression level in response to the low data transmission rate but may not level down the current compression level even if the data transmission rate is high.

Figure 2:
FIG. 2 illustrates how to level up a compression level by reducing DCT coefficients according to one embodiment of the present invention.
Figure 2:
Figure 2:

Once the compression level control circuit 120 determines to level up or down the current compression level, the compression level control circuit 120 directs the compression circuit 110 to change the way of compression. Please refer FIG. 1 in conjunction with FIG. 2, where FIG. 2 illustrates how to level up the compression level according to one embodiment of the present invention. As mentioned above, a quantized DCT block includes 64 DCT quantized coefficients will be generated by the quantization unit 112. In order to level up the compression level, the compression level control circuit 120 may be operable to direct the quantization unit 112 to reduce one or more quantized DCT coefficients corresponding to high-frequency component of the source image. For example, as illustrated in FIG. 2, the quantized DCT coefficients around the bottom right corner of the quantized DCT block, which typically corresponding to the high-frequency components of the source image, will be reduced (e.g., minus by 1). According to various embodiments of the present invention, the quantized DCT coefficients corresponding to the high-frequency component may be reduced sequentially. For example, for a quantized DCT block of a first image block, quantized DCT coefficients in a first group 210 will be reduced. After compression of the first image block is finished, if the data size-related index is worse than expected (e.g., indicating the low remaining capacity of the compression data buffer 130) or the transmission-related index is worse than expected (e.g., indicating receipt of the retransmission request), quantized DCT coefficients in both the first group 210 and a second group 211 regarding a second image block will be reduced. Accordingly, if the data size-related index or transmission-related index is still worse than expected after compression of the second image block, quantized DCT coefficients in all the first group 210, the second group 211 and a third group 212 regarding a third image block will be reduced. Please note that the number of quantized DCT coefficients in a single group is not limitation of the present invention. In some embodiments of the present invention, the quantized DCT coefficients that do not correspond to the high-frequency component may be also reduced if the data size-related index or transmission-related index pretty worse than expected.

In another embodiment, the compression level control circuit 120 may be configured to level up the compression level by directing the quantization unit 112 to adjust the quantization table. For example, the quantization unit 112 may increase one or more elements of the quantization table, thereby to obtain smaller quantized DCT coefficients. By discarding more frequency information of the DCT block, the data size of the compression data can be reduced.

Please note that, the adjustment on the current compression level may be performed between image blocks of a same image or between different images. Specifically, the compression level control circuit 120 may adjust the compression level until a next image is being compressed. Alternatively, the compression level control circuit 120 may adjust the compression level when compressing a next image block of a same frame.

Figure 3:
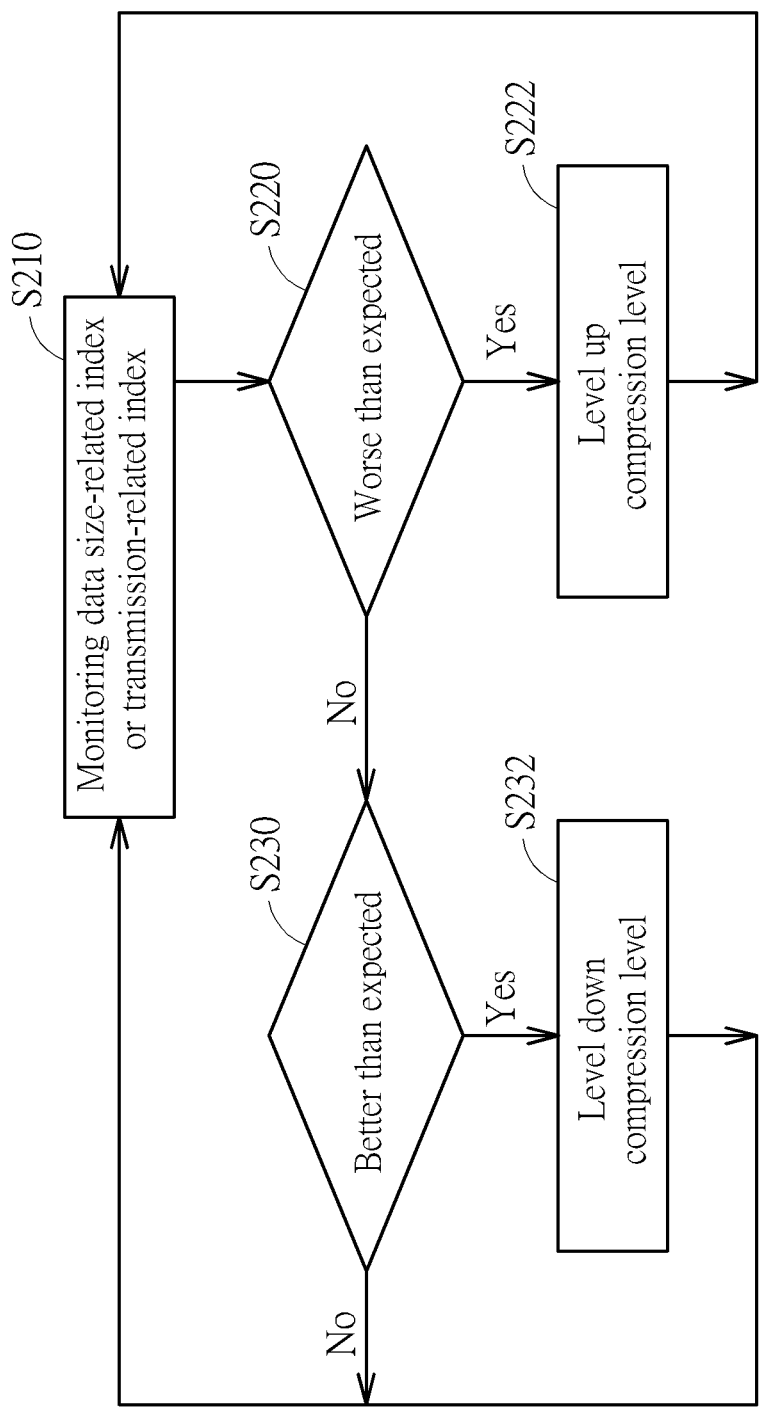
FIG. 3 illustrates a flow chart of adjusting the compression level according to one embodiment of the present invention.

FIG. 3 illustrates a flow regarding how the compression level control circuit 110 adjust the current compression level according to one embodiment of the present invention. At step S210, a data-related index or a transmission-related index is monitored by the compression level control circuit 120. At step S220, it is determined whether the data-related index or the transmission-related index is worse than expected (e.g., low remaining capacity or high water level of the compression data, high data size of the compression data, receipt of the retransmission request, or low data transmission rate). If yes, the flow goes to step S222; otherwise, the flow goes to step S230. At step 230, it is determined whether the data-related index or the transmission-related index is better than expected (e.g., high remaining capacity or low water level of the compression data, low data size of the compression data, or high data transmission rate). If yes, the flow goes to step S232; otherwise, the flow returns back to step S210. At step 222, the compression level control circuit 120 levels up the compression level by instructing the compression circuit 110 to reduce one or more DCT coefficients or adjusting the quantization table, thereby to obtain smaller quantized DCT coefficients. At step 232, the compression level control circuit 120 levels down the compression level by instructing the compression circuit 110 to increase one or more DCT coefficients (if the one or more DCT coefficients are previously reduced) or adjusting the quantization table, thereby obtain higher quantized DCT coefficients.

Figure 4:
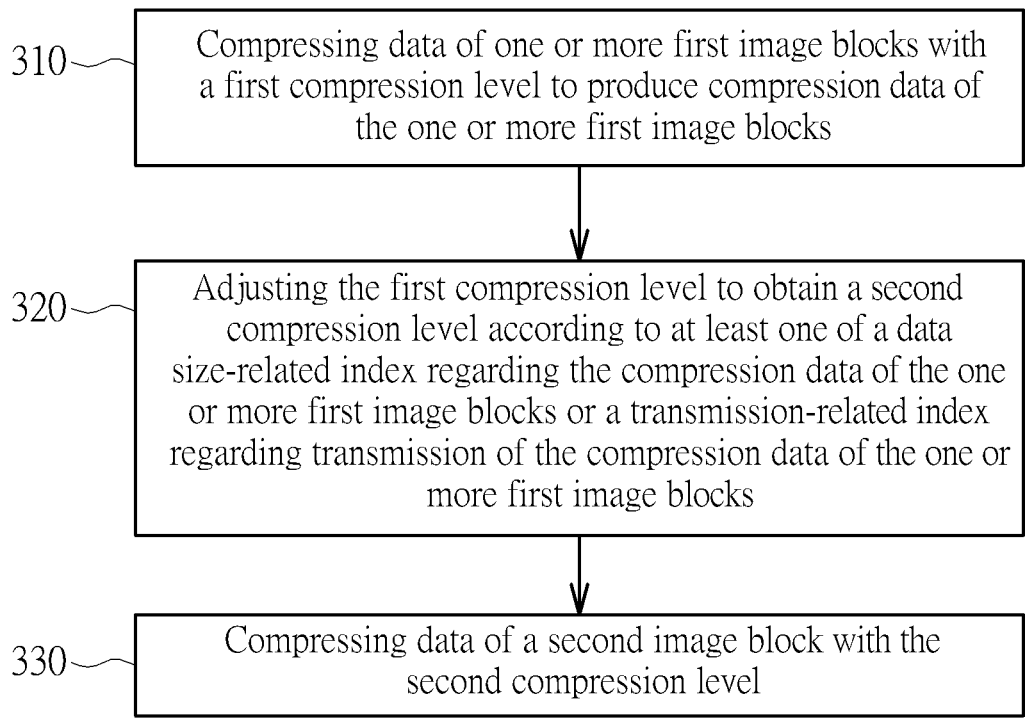
FIG. 4 illustrates a flow chart of a method of compressing images according to one embodiment of the present invention.

FIG. 4 illustrates a method of compressing images based on JPEG standard according to one embodiment of the present invention. As shown in the figure, the method of the present invention includes the following simplified flow:

S310: compressing data of one or more first image blocks with a first compression level to produce compression data of the one or more first image blocks;

S320: adjusting the first compression level to obtain a second compression level according to at least one of a data size-related index regarding the compression data of the one or more first image blocks or a transmission-related index regarding transmission of the compression data of the one or more first image blocks; and S330: compressing data of a second image block with the second compression level.

Figure 5:
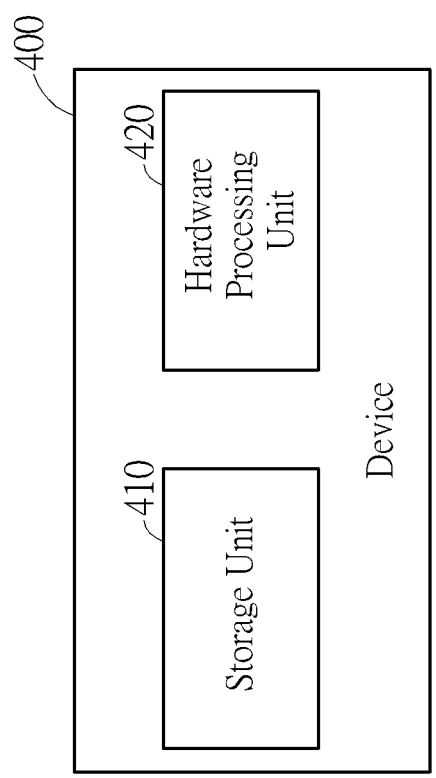
FIG. 5 illustrates a device for implementing a method of compressing images according to one embodiment of the present invention.

Since principles and specific details of the foregoing steps have been explained in detail through the above embodiments, further descriptions will not be repeated here. It should be noted that the above flow may be possible, by adding other extra steps or making appropriate modifications and adjustments, to better realize the image compression and further improve the compression quality and efficiency. Furthermore, all the operations set forth in the above embodiments can be implemented by a device 400 shown in FIG. 5. As in FIG. 5, a storage unit 410 (which can be a non-volatile memory, a volatile memory, or a combination of both) in the device 400 can be used to store program codes, commands, variables, or data. A hardware processing unit (i.e., a general-purpose processor) 420 in the device 400 can execute the program codes and instructions stored in the storage unit 410 and refer to the variables or data therein to perform all the operations in the above embodiments. In some embodiments of the present invention, one or more units or components in the electronic device 10 or the apparatus 100 can also be implemented by pure hardware circuits, such as application specific integrated circuits (ASICs), programmable gate array (PGA) or a field programmable gate array (FPGA) and so on.

Embodiments in accordance with the present embodiments can be implemented as an apparatus, method, or computer program product. Accordingly, the present embodiments may take the form of an entirely hardware embodiment, an entirely software embodiment, or an embodiment combining software and hardware aspects that can all generally be referred to herein as a "module" or "system." Furthermore, the present embodiments may take the form of a computer program product embodied in any tangible medium of expression having computer-usable program code embodied in the medium. In terms of hardware, the present invention can be accomplished by applying any of the following technologies or related combinations: an individual operation logic with logic gates capable of performing logic functions according to data signals, and an application specific integrated circuit (ASIC), a programmable gate array (PGA) or a field programmable gate array (FPGA) with a suitable combinational logic.

The flowchart and block diagrams in the flow diagrams illustrate the architecture, functionality, and operation of possible implementations of systems, methods, and computer program products according to various embodiments of the present embodiments. In this regard, each block in the flowchart or block diagrams may represent a module, segment, or portion of code, which comprises one or more executable instructions for implementing the specified logical function(s). It is also noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions. These computer program instructions can be stored in a computer-readable medium that directs a computer or other programmable data processing apparatus to function in a particular manner, such that the instructions stored in the computer-readable medium produce an article of manufacture including instruction means which implement the function/act specified in the flowchart and/or block diagram block or blocks.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for compressing images based on joint photographic experts group (JPEG) standard, comprising:
    compressing data of one or more first image blocks with a first compression level to produce compression data of the one or more first image blocks;
    adjusting the first compression level to obtain a second compression level according to at least one of a data size-related index regarding the compression data of the one or more first image blocks or a transmission-related index regarding transmission of the compression data of the one or more first image blocks; and
    compressing data of a second image block with the second compression level, comprising:
        converting the data of the second image block into a plurality of discrete cosine transform (DCT) coefficients;
        quantizing the plurality of DCT coefficients of the second image block by applying a quantization table to obtain a plurality of quantized DCT coefficients of the second image block; and
        producing compression data of the second image block by encoding based on the quantized DCT coefficients of the second image block, comprising:
            reducing values of only a subset of the plurality of quantized DCT coefficients of the second image block to obtain at least one value-reduced quantized DCT coefficient through direct value adjustment rather than through quantization table adjustment if the second compression level is higher than the first compression level; and
            producing the compression data of the second image block by encoding the at least one value-reduced quantized DCT coefficient and non-value-reduced quantized DCT coefficients.

2. The method of claim 1, wherein the step of adjusting the first compression level to obtain the second compression level comprises:
    leveling up the first compression level to obtain the second compression level if a remaining capacity of a compressed data buffer which the compression data of the one or more first image blocks are buffered in is lower than a first threshold.

3. The method of claim 1, wherein the step of adjusting the first compression level to obtain the second compression level comprises:
    leveling up the first compression level to obtain the second compression level if a data size of the one or more first image blocks is higher than a first threshold.

4. The method of claim 1, wherein the step of adjusting the first compression level to obtain the second compression level comprises:
    leveling up the first compression level to obtain the second compression level upon receipt of a retransmission request.

5. The method of claim 1, wherein the step of adjusting the first compression level to obtain the second compression level comprises:
    leveling up the first compression level to obtain the second compression level if a data transmission rate of the transmission of the compression data of the one or more first image blocks is lower than a first threshold.

6. The method of claim 1, wherein the step of compressing data of the second image block with the second compression level comprises:
    increasing at least one of elements of the quantization table to obtain an adjusted quantization table;
    quantizing the plurality of DCT coefficients of the second image block by applying the adjusted quantization table to obtain a plurality of quantized DCT coefficients of the second image block; and
    producing the compression data of the second image block by encoding the plurality of quantized DCT coefficients of the second image block.

7. The method of claim 1, wherein the one or more first image blocks and the second image block belong to a same image or different images.

8. An apparatus for compression images based on joint photographic experts group (JPEG) standard, comprising:
    a compression circuit, configured to compress data of one or more first image blocks with a first compression level to produce compression data of the one or more first image blocks, and compress data of a second image block with a second compression level; and
    a compression level control circuit, coupled to the compression circuit, configured to adjusting the first compression level to obtain the second compression level according to at least one of a data size-related index regarding the compression data of the one or more first image blocks or a transmission-related index regarding transmission of the compression data of the one or more first image blocks;
    wherein the compression circuit comprises:
        a discrete cosine transform (DCT) unit, configured to convert the data of the second image block into a plurality of discrete cosine transform (DCT) coefficients;
        a quantization unit, configured to quantize the plurality of DCT coefficients of the second image block by applying a quantization table to obtain a plurality of quantized DCT coefficients of the second image block; and
        an encoding unit, configured to produce compression data of the second image block by encoding based on the quantized DCT coefficients of the second image block
        wherein the quantization unit is configured to reduce values of only a subset of the plurality of quantized DCT coefficients of the second image block to obtain at least one value-reduced quantized DCT coefficient through direct value adjustment rather than through quantization table adjustment if the second compression level is higher than the first compression level; and the encoding unit is configured to produce the compression data of the second image block by encoding the at least one value-reduced quantized DCT coefficient and non-value-reduced quantized DCT coefficients.

9. The apparatus of claim 8, wherein the compression level control circuit is configured to:
level up the first compression level to obtain the second compression level if a remaining capacity of a compressed data buffer which the compression data of the one or more first image blocks are buffered in is lower than a first threshold.

10. The apparatus of claim 8, wherein the compression level control circuit is configured to:
level up the first compression level to obtain the second compression level if a data size of the one or more first image blocks is higher than a first threshold.

11. The apparatus of claim 8, wherein the compression level control circuit is configured to level up the first compression level to obtain the second compression level upon receipt of a retransmission request.

12. The apparatus of claim 8, wherein the compression level control circuit is configured to:
level up the first compression level to obtain the second compression level if a data transmission rate of the transmission of the compression data of the one or more first image blocks is lower than a first threshold.

13. The apparatus of claim 8, wherein the quantization unit increases at least one of elements of the quantization table to obtain an adjusted quantization table, and accordingly quantizes the plurality of DCT coefficients of the second image block by applying the adjusted quantization table to obtain a plurality of quantized DCT coefficients of the second image block; and the encoding unit produces the compression data of the second image block by encoding the plurality of quantized DCT coefficients of the second image block.

14. The apparatus of claim 8, wherein the one or more first image blocks and the second image block belong to a same image or different images.

\* \* \* \* \*